United States Patent

[11] 3,590,137

| [72] | Inventor | Anthony N. Librandi |
| | | 12 Thompson St., Larchmont, N.Y. 10538 |
| [21] | Appl. No. | 3,026 |
| [22] | Filed | Jan. 15, 1970 |
| [45] | Patented | June 29, 1971 |

[54] ELECTRIC FIXTURE HOUSING FASTENING DEVICE
9 Claims, 3 Drawing Figs.

[52] U.S. Cl. .................................................. 174/58, 220/3.6
[51] Int. Cl. ...................................................... H02g 3/12
[50] Field of Search ............................................ 174/58; 248/DIG. 6; 220/3.6, 3.3, 3.5, 3.9

[56] References Cited
UNITED STATES PATENTS
| 2,044,650 | 6/1936 | Thompson | 248/DIG. 6 |
| 2,531,698 | 11/1950 | Petric et al. | 174/58 |
| 2,965,348 | 12/1960 | Gerstel et al. | 220/3.6 |

Primary Examiner—Lewis H. Myers
Assistant Examiner—D. A. Tone
Attorneys—Clarence A. O'Brien and Harvey B. Jacobson ABSTRACT: A fastening device for an open-bottom recessed electric fixture housing equipped with circumferentially spaced mounting slots and a ceiling abutting flange or rim. Each fastening device comprises (1) a one piece adapter bracket (2) a complemental clip, and (3) a screw-threaded headed fastener which is adapted to be passed through a bolt hole in the ceiling and screwed into coacting screw-threaded holes provided thereof in oriented portions of the bracket and clip respectively. The adjacent upper ends of the bracket and clip have T-shaped anchoring tabs keyed one above the other in the associated slot. Tightening the screw with a screwdriver lifts the housing and clamps it securely in its given position.

PATENTED JUN29 1971 3,590,137
Fig. 1
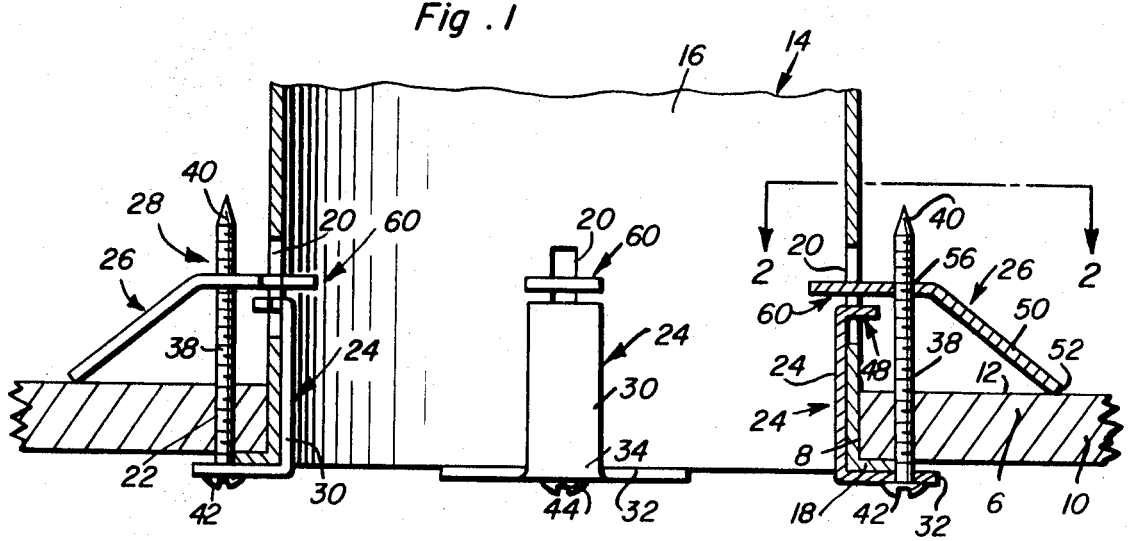
Fig. 2
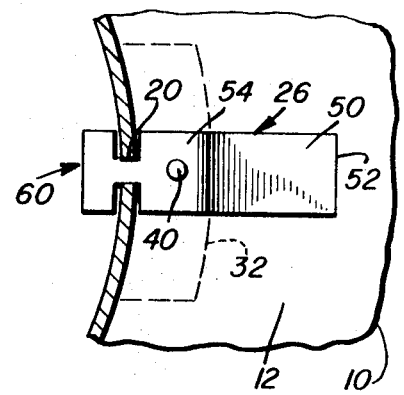
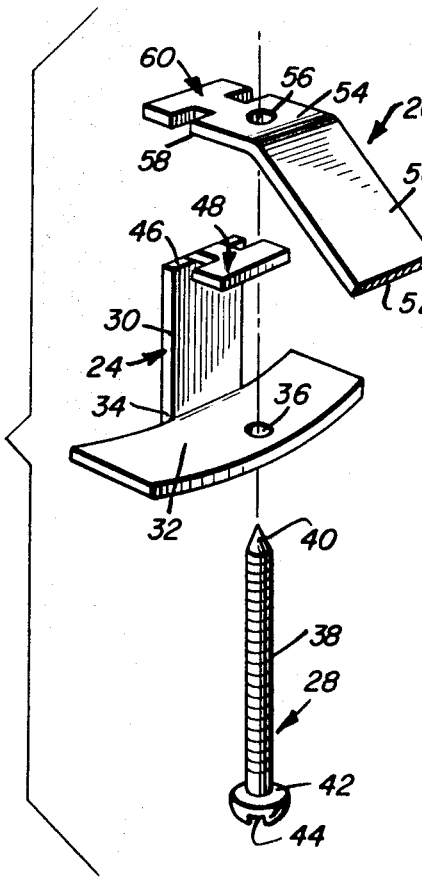
Fig. 3
Anthony N. Librandi
INVENTOR
BY Clarence A. O'Brien
and Harvey B. Jacobson
Attorneys

ELECTRIC FIXTURE HOUSING FASTENING DEVICE

This invention relates to installation of prefabricated recessed electric fixture housings in newly constructed ceilings where provisions have already been made for installing needs and also finished ceilings where no provisions have been made and which present difficulties for the installer, and pertains, more particularly, to a fastening device which is easy to install, saves time and labor, is inexpensive, is reusable, and well serves the purposes for which it has been devised.

Most manufacturers of recessed electric fixture housings provide mounting rims and complemental means therefor. These rims are such that they can be installed on the ceiling supports or framing before the ceiling is finished. Such fixtures can then be slid into predetermined position after the ceiling is completed and can be fastened in place by the retaining means provided. It follows that the installation of such lighting fixtures does not, generally stated, pose a problem where installation requirements have been properly planned. On the other hand, the installation of recessed fixtures in finished ceilings where no provision has been made to satisfactorily carry out installation steps can present many problems to the installer. The job necessitates the cutting of a hole of the proper size and then, depending on the type of construction of the ceiling, to fabricate at the site of installation satisfactory means of supporting and fastening the fixture in its intended place. In many instances a hole larger than is actually needed to receive the fixture must be cut, a mounting device such as a rim installed, the ceiling patched, and a return trip must be made to install the fixture housing after the patched portion is dried and hardened. Manifestly, pursuing such steps results in the loss of time and increases the cost to the installer. Variations in ceiling construction and thickness of the ceiling cause separate and individual problems to crop up. For example, age of the ceiling material can cause unforeseen difficulties because of the likelihood of crumbling of the material, when a structural device is fastened to it or forced into it for retention purposes.

Many and varied prior art contrivances have been devised for the purpose of mounting recessed-type lighting fixtures. Some are complicated and many are appropriate for particular installations only. Others call for the use of collateral appliances other than the device itself. It follows that it is an object of the present invention to advance the art and to provide fastening devices which more satisfactorily achieve the overall results desired.

A fixture housing installed with the aid of the herein disclosed fastening devices, and more particularly because of the shape and form of a unique adapter bracket (FIG. 3), can readily be removed for repairs and reinstalled with the same fastening devices without damage to the ceiling or the finish thereof. To the ends desired and, as will be hereinafter more fully understood, the adapter bracket has a special purpose flange which is designed to provide a retaining flange for fixture housings which are not provided with flange means when manufactured.

Recessed fixtures can be mounted in ceilings of any ordinarily used thickness by varying the length of the screw-threaded fastener device. In fact, using a readily available machine screw in conjunction with the flanged adapter permits use thereof on almost any type of recessed fixture housing, whether or not the housing has a flanged edge to prevent it from entering the ceiling opening. Then, too, the fastening device herein revealed lends itself to expeditious installation after the fixture housing is fitted into position in the ceiling opening and permits the job to be carried out from the inside of the housing and necessitates only the use of a screw driver for installation purposes. Further, the invention lends itself to use on virtually any make of fixture housing which is equipped with longitudinal circumferentially spaced mounting slots and a separate ceiling finish rim.

Briefly the invention is characterized by a one piece adapter bracket made of suitable strap metal which is bent upon itself to provide a centrally disposed leg of requisite length and height, said leg being provided at its lower end with a ledgelike seating flange which is disposed at right angles to the lengthwise axis of the leg. This seating flange is of suitable size and shape in plan and is provided with a so-called bolt hole. The upper end is provided with a right angularly disposed T-shaped leg attaching tab which is situated in a position over and substantially parallel with the flange. The complemental component part comprises a clip. This clip is also of rigid one piece strap construction and embodies an oblique angled depending thrust applying and clamping brace or limb whose lower end is free and adapted to be clampingly stabilized against a coacting ceiling surface. This limb or brace is provided at an upper end with a tanglike extension which is provided with a bolt hole cooperable with the first-named bolt hole and it terminates in a T-shaped clip keying and attaching tab. The assembling and connecting fastener comprises a machine screw or bolt which has a head at the lower end with an accessible screwdriver kerf. The threaded shank is passed through a hole in the ceiling end and through the bolt holes and is connected therewith and has a pointed upper end for piloting purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view showing a fragmentary portion of a ceiling with an opening therein, the fixture housing inserted and showing, what is more significant, several of the fastening devices in section and elevation and disclosing how they are constructed and appropriately used.

FIG. 2 is a view taken approximately on the plane of the section line 2–2 of FIG. 1.

FIG. 3 is an exploded perspective view showing the several components which go to make up the ready-to-use fastening device.

With reference to FIG. 1 the room ceiling is denoted by the numeral 6 and has the desired opening or hole 8 cut therein. The bottom of the ceiling is denoted at 10 and the interior or top surface at 12. The fixture housing is denoted at 14 and is of the usual inverted cuplike form, the body thereof being denoted at 16. In practice and as put out by the manufacturer, the open bottom of this cylindrical housing is provided with an outstanding endless flange 18 which abuts the surface 10 of the ceiling. Above the flange at the requisite level the wall of the housing is provided with vertically elongated circumferentially spaced keeper slots 20.

As before suggested the fastening devices which are herein disclosed and appropriated for highly efficient use are simple, practical and easy to use. These devices are so made as to be installed with requisite nicety and certainty as illustrated in FIG. 1. To the ends desired, the ceiling 6 is provided with bored holes 22 wherever necessary or desired and which may be conveniently referred to as bolt holes.

It can be assumed that in practice the cylindrical housing is provided with equidistant circumferentially spaced slots 20 here designated as keeper slots for convenience of designation and explanation.

Each fastening device is the same in construction and is constructed as detailed in FIG. 3, wherein it will be noted that the aforementioned adapter bracket is denoted by the numeral 24, the complemental or companion stabilizing and assembling clip by the numeral 26 and the screw-threaded headed fastener by the numeral 28. The bracket 24 is formed from a suitably stamped and proportionate strap. This metal or equivalent strap is bent upon itself to provide a median portion which is referred to as a leg 30. The ledgelike seating and retaining flange 32 is bent as at 34 so that it assumes a position at approximate right angles to the lengthwise dimension of the leg. This flange (which could also be referred to as a foot or a stirrup) is preferably rectangular in plan and is horizontally elongated, is arcuate also in plan to serve the shape needs illustrated in FIG. 2. Then, too, it is slightly longitudinally bowed and resilient so that when it is tightened up it flattens out and provides the desired binding result evident from FIG. 1. It will also be noted that this flange 32 prevents the housing from entering the opening beyond the ceiling finish line and is highly advantageous in use. The median portion of this flange is provided with a hole 36 which is conveniently referred to as a bolt hole to accommodate the screw-threaded shank 38 of the fastener 28. It will be noted that the upper end of this shank is pointed as at 40 for guidance and piloting purposes. The lower headed end 42 is provided with a screwdriver kerf 44 which facilitates carrying out the required steps of the job using an ordinary screwdriver (not shown). The upper end portion of the leg 46 is provided with assembling and attaching means which is here referred to as a T-shaped tab 48. The head of the T can be inserted through the keeper slot 20 by paralleling the head with the length of the slot after which the narrowed neck portion can be returned in the slot in a manner to anchor the T-head in place as shown in FIG. 1. The clip 26 is also formed from a length of strap metal of requisite strength and bendability. The longer part thereof which is denoted at 50 provides a depending thrust applying and clamping brace or limb whose lower end 52 is straight across to reside flatwise on the ceiling surface 12 is the manner illustrated in FIG. 1. The upper end of this limb or brace is provided with an oblique-angled tanglike extension 54 which is provided centrally with a bolt hole 56 which is aligned with the aforementioned hole 36. The terminal end of the extension 58 is provided with a coplanar T-shaped tab 60 which is similar in shape and size to the aforementioned tab 48. This clip can be inserted from the inside of the housing and passes through the slot and then turned in a manner to interlock the T-shaped attaching tab 60 with the slot 20. The head 60 is in the lower portion of the slot just above the head or tab 48. The shank of the fastener 28 is threaded through the ceiling hole or bore 22 after having been passed through the hole 36 and it is then screwed into place in the hole 56. These holes could be threaded in advance or the screw could be self-threading.

It will be obvious that after the screw or fastener 28 has been properly installed, turning the screw clockwise will cause a lever action downward on the clip 26 and will cause the thrust member or lim 50 to firmly engage the upper or top side 12 of the ceiling (FIG. 1). At the same time, the adapter bracket 24 is forced upward against the lower or finished side 10 of the ceiling. These two counteractions, accomplished in one operation, will result in anchoring and holding the housing in proper position with the bottom edge of the housing flush with the finished edge of the ceiling. No further adjusting or leveling is ordinarily necessary. It has been found that by using one complete fastening device for each slot the fixture housing is adequately stabilized and will well serve the purposes for which it is to be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What I claim as new is as follows:

1. In combination, a recessed-type open-bottom electric fixture housing such as is designed and adapted to be installed for operation in an opening expressly provided therefor in a room ceiling and which has circumferentially spaced vertically elongated keeper slots and is provided at its open bottom with an outstanding ceiling abutting flange, and a plurality of fastening devices for said housing, one fastening device for and cooperable with each keeper slot, each device comprising an adapter bracket embodying a leg parallel and proximal to an interior surface of said housing, said leg having an upper end provided with means separably keyed in a coacting keeper slot and a lower end provided with means which underlies and has supportive engagement with a coacting portion of said flange, a clip oriented with said adapter bracket and having a depending thrust member at one end residing and braced atop an upper surface of said ceiling and clip attaching means at the other end separably keyed in said keeper slot, and an assembling fastener adjustably connecting said adapter bracket and clip together in coordinating relationship.

2. The combination defined in and according to claim 1, and wherein said adapter bracket is of one piece construction, said leg being of a length that it extends from the locale of said slot, through and beyond the open bottom and said ceiling abutting flange.

3. The combination defined in and according to claim 2, and wherein the means at said upper end comprises a T-shaped leg attaching tab, said tab being detachably keyed and retained in said keeper slot.

4. The combination defined in and according to claim 2, and wherein the means at said upper end comprises a T-shaped leg attaching tab, said tab being detachably keyed and retained in said keeper slot, and wherein the means at the lower end of said leg comprises a ledgelike flange which is disposed in a plane at right angles to the plane of said leg and being elongated and longitudinally bowed and bendably resilient.

5. The combination defined in and according to claim 1, and wherein said clip is of one piece rigid construction and wherein the means at said other end comprises a T-shaped clip attaching tab, said tab being insertable into and detachably keyed for retention in said keeper slot.

6. The combination defined in and according to claim 5, and wherein said depending thrust member comprises an oblique-angled brace, said brace having an upper end integrally joined with a tanglike extension terminating in said T-shaped clip attaching tab.

7. The combination defined in and according to claim 6, and wherein said extension is provided with a screw-threaded hole, and wherein said assembling fastener comprises a screw-threaded headed fastener which has a threaded end portion screwed into and through said holes.

8. A fastening device for an open-bottom flanged electric fixture housing having a vertically elongated keeper slot comprising a one piece adapter bracket embodying a leg having a lower end provided with a ledgelike seating flange which is disposed at right angles to the lengthwise axis of said leg, said seating flange being arcuate in plan, longitudinally bowed, bendably resilient, and provided with a bolt hole and having an upper end provided with a right angled T-shaped leg attaching tab situated in a position over and substantially parallel to said seating flange, a clip complemental to said adapter bracket, said clip being of rigid one piece construction and embodying an oblique-angled depending thrust applying and clamping brace whose lower end is free and is adapted to be clampingly stabilized against a coacting ceiling surface, said brace being provided at an upper end with a tanglike extension provided with a bolt hole and terminating in a T-shaped clip keying and attaching tab, and an assembling and connecting fastener adjustably but operatively linking said bracket and clip.

9. The fastening device defined in and according to claim 8, and wherein said fastener comprises a bolt having a head at a lower end with an accessible screwdriver kerf, a threaded shank screwed through said bolt holes, and a pointed upper end.